United States Patent [19]

denOtter et al.

[11] 4,063,020

[45] Dec. 13, 1977

[54] MIXED HYDROXYMETHYL-HYDROXYALKYL ISOCYANURATES

[75] Inventors: Marinus J. A. M. denOtter, Munstergeleen; Albert A. van Geenen, Brunssum, both of Netherlands

[73] Assignee: Stamicarbon, B.V., Geleen, Netherlands

[21] Appl. No.: 694,645

[22] Filed: June 10, 1976

[30] Foreign Application Priority Data

June 12, 1975 Netherlands .......................... 7506982

[51] Int. Cl.$^2$ ............................................. C07D 251/34
[52] U.S. Cl. ............................. 544/221; 260/77.5 AQ
[58] Field of Search .................................. 260/248 NS

[56] References Cited

U.S. PATENT DOCUMENTS

| 2,901,463 | 8/1959 | Hurwitz | 260/248 NS X |
| 2,950,553 | 8/1960 | Hurwitz | 260/248 NS X |
| 3,660,327 | 5/1972 | Loncrini et al. | 260/248 NS X |
| 3,981,998 | 9/1976 | Waldstein | 260/248 NS X |

Primary Examiner—John M. Ford
Attorney, Agent, or Firm—Cushman, Darby & Cushman

[57] ABSTRACT

New mixed hydroxymethyl-hydroxyalkyl isocyanurates are produced. Each hydroxyalkyl group in the mixed isocyanurates may contain between two and twelve carbon atoms. These mixed hydroxymethyl-hydroxy ($C_2$–$C_{12}$ alkyl) isocyanurates are produced by reacting cyanuric acid with (1) a hydroxymethylating agent and (2) a hydroxyalkylating agent. The order of these two reactions may be varied.

18 Claims, No Drawings

MIXED HYDROXYMETHYL-HYDROXYALKYL ISOCYANURATES

BACKGROUND OF THE INVENTION

The present invention relates to mixed hydroxymethylhydroxyalkyl isocyanurates. Here and hereinafter the terms "hydroxyalkyl" and "(higher) hydroxyalkyl" denote not hydroxymethyl, but only hydroxyalkyl with more than one carbon atom, unless stated otherwise.

Representatives of the trishydroxyalkyl isocyanurates with three identical hydroxyalkyl groups, including trishydroxymethyl isocyanurate, are well known and are used for many purposes. U.S. patent application Ser. No. 588,944, filed June 20, 1975, now U.S. Pat. No. 4,031,040 which is hereby incorporated by reference, discloses the use of trishydroxymethyl isocyanurate as a polyol in the preparation of polyurethanes from a polyol and a polyisocyanate. This has several advantages over other polyols. However, when used for the preparation of polyurethanes, the known trishydroxyalkyl isocyanurates have the drawback that all three hydroxy groups have the same reactivity towards the polyisocyanate, whereas a polyol with hydroxy groups of different reactivity is desirable for the preparation of some polyurethanes. The present invention meets the need of providing polyols that combine the advantages of trishydroxymethyl isocyanurate with the advantages of polyols having hydroxy groups of different reactivity by making available mixed hydroxymethyl-hydroxyalkyl isocyanurates. Polyurethanes prepared from the mixed hydroxymethylhydroxyalkyl isocyanurates of the present invention may be used for the preparation of foams, lacquers, varnishes etc.

SUMMARY OF THE INVENTION

Mixed hydroxymethyl-hydroxyalkyl isocyanurates are new substances. The mixed hydroxymethyl-hydroxyalkyl isocyanurates may contain either one hydroxymethyl group and two (higher) hydroxyalkyl groups or two hydroxymethyl groups and one (higher) hydroxyalkyl group, bound to nitrogen atoms in the ring. The term mixed hydroxymethyl-hydroxyalkyl isocyanurates according to the present invention also comprises compounds in which one or more hydroxymethyl groups have been replaced by hydroxypolyoxymethylene groups containing 2-4 oxymethylene units, and oligomers of the mixed isocyanurates, which compounds can easily be formed by condensation of the mixed isocyanurates, into which they can be changed again by decondensation.

Each (higher) hydroxyalkyl group in the mixed isocyanurates according to the invention may contain between two and twelve carbon atoms, and preferably between two and six carbon atoms.

DETAILED DESCRIPTION OF THE INVENTION

The new compounds according to the present invention can be obtained in a way that is known in the art for the preparation of analogous compounds. One possibility is that cyanuric acid is made to react simultaneously with a hydroxymethylating agent, e.g. formaldehyde or a compound releasing formaldehyde, such as paraformaldehyde, and with a hydroxyalkylating agent, e.g. an epoxide, such as ethylene oxide, propylene oxide, 2,3-epoxybutane or 1,2-epoxyhexane.

Preferably, however, cyanuric acid is first made to react with the desired amount of epoxide to form a mono or bis-hydroxyalkyl isocyanurate, and this intermediate product is then converted with the hydroxymethylating agent.

According to a particularly advantageous and surprising preparatory process, bis or trishydroxymethyl isocyanurate, which may be obtained from cyanuric acid and formaldehyde or paraformaldehyde in a known way, is then converted with the hydroxyalkylating agent, such as an epoxide. In this process one or two of the hydroxymethyl groups are replaced by a higher hydroxyalkyl group.

The above reactions may be carried out in water or, e.g., in a substantially inert, aprotic polar solvent or mixture of solvents. Some suitable solvents are nitriles and ketones, such as acetonitrile, cyclohexanone, methyl-ethyl ketone, or, e.g., dimethyl formamide, dioxane, pyridine, or liquid flame-extinguishing compounds, such as tris(2-chloroethyl) phosphate.

The reactions may be carried out at temperatures up to 100° C., preferably at 50° to 90° C. The reaction pressure may be varied; both atmospheric and above atmospheric pressures may be used.

The mixing ratio of the reactants naturally depends on the stoichiometry of the desired compound.

The pH appears to have little influence during the reaction, and may preferably vary between pH values of 1 and 7 in water. A final pH of between 1 and 5 is particularly desirable. Higher pH values, e.g. up to 10, may be used if desired.

After completion of the reaction, the solvent may be removed, e.g., by evaporation at reduced pressure. During this evaporation, the temperature is preferably kept below 60° C., a temperature of about 40° C. being best. It is therefore recommended to chose a solvent that is volatile under the reaction conditions chosen.

Examples of mixed isocyanurates according to the present invention that can be prepared in the ways indicated are bis(hydroxymethyl)-(2-hydroxypropyl) isocyanurate and hydroxymethyl-bis(2-hydroxypropyl) isocyanurate, bis(hydroxymethyl)-(2-hydroxybutyl) isocyanurate and bis(hydroxymethyl)-(2-hydroxy-1-methylpropyl) isocyanurate. The first two can be obtained with the use of propylene oxide as the epoxide, the third with the use of 1,2-epoxy-butane, and the fourth with the use of 2,3-epoxybutane.

The use of propylene oxide or higher 1,2-epoxy compounds will produce polyols with one or two primary hydroxyl groups (the hydroxymethyl groups) and, respectively, two or one secondary hydroxyl group, so that a polyol with hydroxyl groups of different reactivity is formed.

It is not necessary for all three N atoms of the isocyanurate ring to carry a hydroxyalkyl group (including hydroxymethyl). Careful splitting off of formaldehyde, e.g. by heating at, e.g., about 70° C., makes it possible to obtain a monohydroxymethyl-monohydroxyalkyl isocyanurate from a bishydroxymethyl-monohydroxyalkyl isocyanurate.

For some applications, it is advantageous that part of the hydroxyl groups of the mixed hydroxymethyl-hydroxyalkyl isocyanurate, e.g., at most one third, have been etherified or esterified. To this end, the isocyanurate is made to react with a deficient amount of acylating or etherifying agent, e.g. an acid, acid anhydride, acid chloride or alcohol, such as an aliphatic or aromatic carboxylic acid containing one to seven carbon atoms or the anhydride or acid chloride thereof, or an aliphatic alcohol containing one to six carbon atoms. For the reaction conditions that may be used in this type of etherifications and esterifications, reference is made to the "Ukrainan Chemical Journal" 30, No. 2, pages 195–198 (1964).

The invention will be elucidated with reference to the following examples:

EXAMPLE I

Preparation of mixed hydroxymethyl-2-hydroxypropylisocyanurate

In a flask provided with a stirrer, a heating jacket and a reflux condenser, 828 grams of a 74% by weight solution of trishydroxymethyl isocyanurate (molar $CH_2O$/cyanuric acid ratio = 2.87/1) in dimethyl formamide with 0.2% by weight of water were mixed with 168 grams of propylene oxide and 3.6 grams of triethyl amine. The reaction mixture was then boiled for 24 hours with stirring and reflux cooling. The temperature did not exceed 75° C. during the entire reaction. The temperature of the reflux condenser was kept at −25° C. Towards the end of the reaction, reflux hardly occurred any longer. Thus, 995 grams of a mixture were obtained which had a lower viscosity (224.9 cSt at 68° C.) than the starting mixture. Analysis gave the following results:

hydroxymethyl isocyanurate: 11.6% by weight (as cyanuric acid)
hydroxymethyl isocyanurate plus mixed hydroxymethylhydroxypropyl isocyanurate: 35.2% by weight (as cyanuric acid)
formaldehyde: 21.5% by weight
water: 0.2% by weight
dimethyl formamide: not determined Hydroxymethyl isocyanurate was determined by diluting the mixture with excess water and precipitating the cyanuric acid by addition of melamine. The total amount of hydroxymethyl plus mixed isocyanurate was determined by titrations with a base.

It was determined, also on the basis of nuclear-spin resonance, that the mixed isocyanurate was mixed hydroxymethyl-2-hydroxypropyl-isocyanurate, and that it consisted substantially of bis(hydroxymethyl)-mono-(2-hydroxypropyl) isocyanurate.

EXAMPLE II

Preparation of mixed hydroxymethyl-(1-methyl-2-hydroxypropyl)-isocyanurate

In the same way as described in Example I 118.5 grams of tris(hydroxymethyl) isocyanurate (molar $CH_2O$/cyanuric acid ratio 2.77/1) in dimethyl formamide with 0.3% by weight af water and in the presence of 0.5 grams of triethyl amine are reacted with 34 grams of trans-butyleneoxide-2,3. Reaction time is 21 hours, temperature of the reflux condenser is −25° C.

Nuclear magnetic spin resonance analysis reveals that the obtained mixed isocyanurate is mixed hydroxymethyl-(1-methyl-2-hydroxypropyl) isocyanurate and consists substantially of bis(hydroxymethyl)-mono(1-methyl-2-hydroxypropyl) isocyanurate.

EXAMPLE III

Preparation of mixed hydroxymethyl-(2-hydroxy-2-methylpropyl) isocyanurate

In the same way as described in Example II 131 grams of tris(hydroxymethyl) isocyanurate (molar $CH_2O$/cyanuric acid ratio 2.77/1) in dimethyl formamide with 0.3% by weight of water and in the presence of 0.6 grams of triethyl amine are reacted with 43 grams of isobutyleneoxide.

Nuclear magnetic spin resonance analysis reveals that the obtained mixed isocyanurate is mixed hydroxymethyl-(2-hydroxy-2-methylpropyl) isocyanurate and consists for at least 80% of the bis(hydroxymethyl)mono(2-hydroxy- 2-methylpropyl) isocyanurate.

EXAMPLE IV

Following the procedure set forth in Example I, but using the double amount of propylene oxide a mixed isocyanurate is produced which consists substantially of hydroxymethyl-bis(2-hydroxy-propyl) isocyanurate.

EXAMPLE V

Following the procedure set forth in Example I, but substituting an equimolar amount of 1,2-epoxyhexane in place of propylene oxide, a mixed isocyanurate is produced which consists substantially of bis(hydroxymethyl)-(2-hydroxyhexyl) isocyanurate.

EXAMPLE VI

Following the procedure set forth in Example I, but substituting an equimolar amount of 1,2-epoxydodecane in place of propylene oxide, a mixed isocyanurate is produced which consists substantially of bis(hydroxymethyl)-(2-hydroxydodecyl) isocyanurate.

EXAMPLE VII

Preparation of partially esterified mixed hydroxymethyl-(2-hydroxypropyl)-isocyanurate In a flask provided with a stirrer, a heating jacket and a reflux condenser, 45 grams of mixed hydroxymethyl-(2-hydroxypropyl) isocyanurate obtained according to Example I and 40 grams of acetic anhydride are introduced. Then 0.5 ml of concentrated sulphuric acid are added, and thereafter the temperature is maintained at 50°–55° C. After the exothermic reaction has finished, the reaction is continued for 2 hours, whereupon the wanted partially esterified mixed hydroxymethyl-(2-hydroxypropyl) isocyanurate is obtained.

What is claimed is:

1. A mixed hydroxymethyl-hydroxy ($C_2$-$C_{12}$ alkyl) isocyanurate.
2. A mixed isocyanurate according to claim 1 wherein at least a portion of the hydroxyl groups have been esterified or etherified.
3. Bis(hydroxymethyl)-mono(2-hydroxypropyl) isocyanurate.
4. Hydroxymethyl-bis(2-hydroxypropyl) isocyanurate.
5. Bis(hydroxymethyl)-mono(1-methyl-2-hydroxypropyl)isocyanurate.
6. Bis(hydroxymethyl)-mono(2-methyl-2-hydroxypropyl) isocyanurate.
7. A process for preparing a mixed isocyanurate as set forth in claim 1, wherein cyanuric acid is made to react simultaneously with a hydroxymethylating agent and a hydroxyalkylating agent.

8. A process for preparing a mixed isocyanurate as set forth in claim 1, wherein cyanuric acid is first made to react with the desired amount of epoxide to form a mono or bishydroxyalkyl isocyanurate, and this intermediate product is then converted with a hydroxymethylating agent.

9. A process for preparing a mixed isocyanurate as set forth in claim 1, wherein bis- or trishydroxymethyl isocyanurate is first prepared and then converted with a hydroxyalkylating agent.

10. The process for preparing a mixed isocyanurate as set forth in claim 7, wherein the hydroxymethylating agent is formaldehyde or paraformaldehyde and the hydroxyalkylating agent is an epoxide.

11. The process for preparing a mixed isocyanurate as set forth in claim 8, wherein the hydroxymethylating agent is formaldehyde or paraformaldehyde and the hydroxyalkylating agent is an epoxide.

12. The process for preparing a mixed isocyanurate as set forth in claim 9, wherein the hydroxymethylating agent is formaldehyde or paraformaldehyde and the hydroxyalkylating agent is an epoxide.

13. The process for preparing a mixed isocyanurate as set forth in claim 10, wherein the hydroxyalkylating agent is propylene oxide.

14. The process for preparing a mixed isocyanurate as set forth in claim 11, wherein the hydroxyalkylating agent is propylene oxide.

15. The process for preparing a mixed isocyanurate as set forth in claim 12, wherein the hydroxyalkylating agent is propylene oxide.

16. A mixed hydroxymethyl-hydroxy ($C_2$–$C_{12}$ alkyl) isocyanurate prepared by the process of claim 7.

17. A mixed hydroxymethyl-hydroxy ($C_2$–$C_{12}$ alkyl) isocyanurate prepared by the process of claim 8.

18. A mixed hydroxymethyl-hydroxy ($C_2$–$C_{12}$ alkyl) isocyanurate prepared by the process of claim 9.

* * * * *